United States Patent [19]

Meyer

[11] 4,028,460

[45] June 7, 1977

[54] METHOD FOR MAKING FIBER REINFORCED RESIN GRATING

[75] Inventor: Leonard S. Meyer, Columbia, S.C.

[73] Assignee: Sybron Corporation, Rochester, N.Y.

[22] Filed: June 21, 1972

[21] Appl. No.: 266,520

Related U.S. Application Data

[62] Division of Ser. No. 110,076, Jan. 27, 1971, Pat. No. 3,704,561.

[52] U.S. Cl. .............................. 264/263; 264/271; 264/279
[51] Int. Cl.² ...................... B29D 3/02; B29G 7/00
[58] Field of Search ............. 264/31, 34, 229, 231, 264/250, 254, 228, 261, 263, 271, 279, 255, 262, 277, 137, 131; 52/660, 223, 230; 161/109, 128; 249/60

[56] References Cited

UNITED STATES PATENTS

| | | | |
|---|---|---|---|
| 2,296,453 | 9/1942 | Saffert | 264/131 |
| 2,566,817 | 9/1951 | Yellin | 249/60 |
| 2,567,186 | 9/1951 | Cross et al. | 264/131 X |
| 2,749,266 | 6/1956 | Eldred | 264/137 |
| 2,903,388 | 9/1959 | Jonke et al. | 264/261 |
| 2,921,463 | 1/1960 | Goldfein | 52/309 |
| 3,111,569 | 11/1963 | Rubenstein | 52/230 |
| 3,214,321 | 10/1965 | Graham | 161/131 |
| 3,551,237 | 12/1970 | Cox et al. | 156/173 |
| 3,678,147 | 7/1972 | Patchen | 264/277 |

Primary Examiner—Willard E. Hoag
Attorney, Agent, or Firm—Synnestvedt and Lechner

[57] ABSTRACT

A grating comprising preformed fiber reinforced resin strips stacked in the positions of the intersecting bars of the grating and with the strips interleaving at the points of intersection, the reinforcement strips being embedded in a resin matrix. The method for making the grating comprises forcing the fiber reinforced strips with the fibers under tension, and assembling such preformed strips in a mold having a network of intersecting cavities for defining the grating bars, the cavities being initally charged with liquid hardenable resin material, so that the reinforcement strips are submerged in the liquid resin during assembly, the embedment resin being subsequently hardened.

2 Claims, 14 Drawing Figures

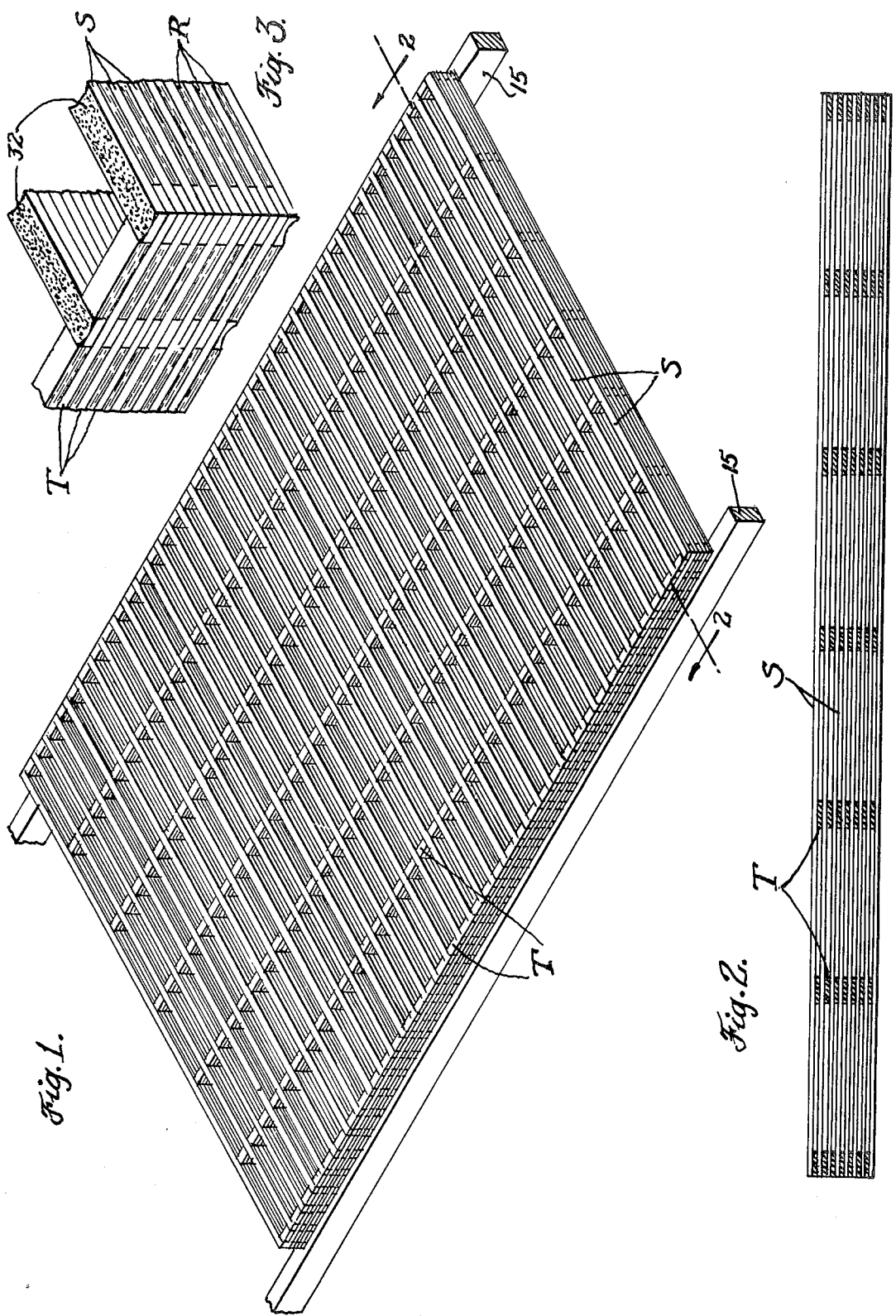

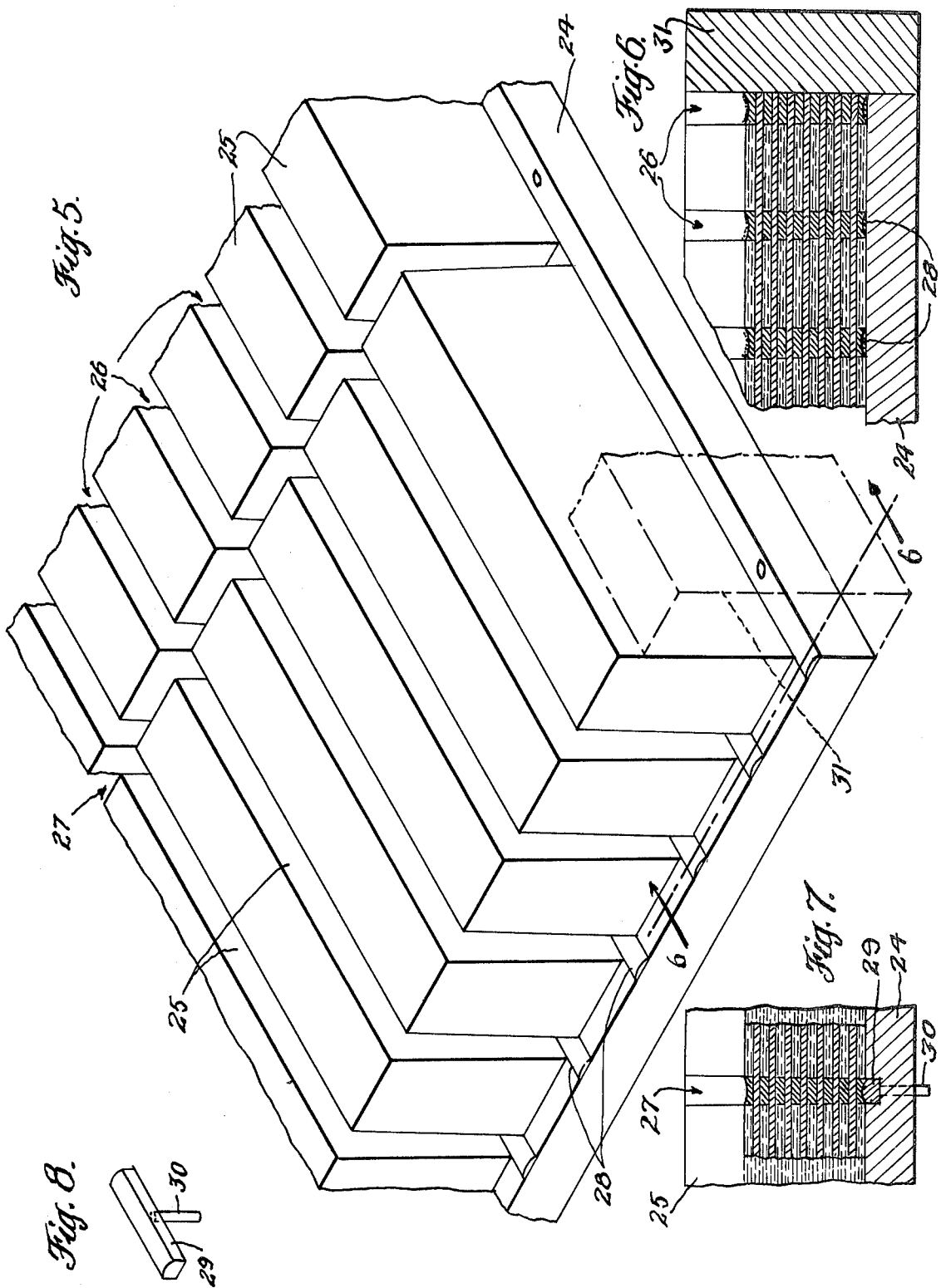

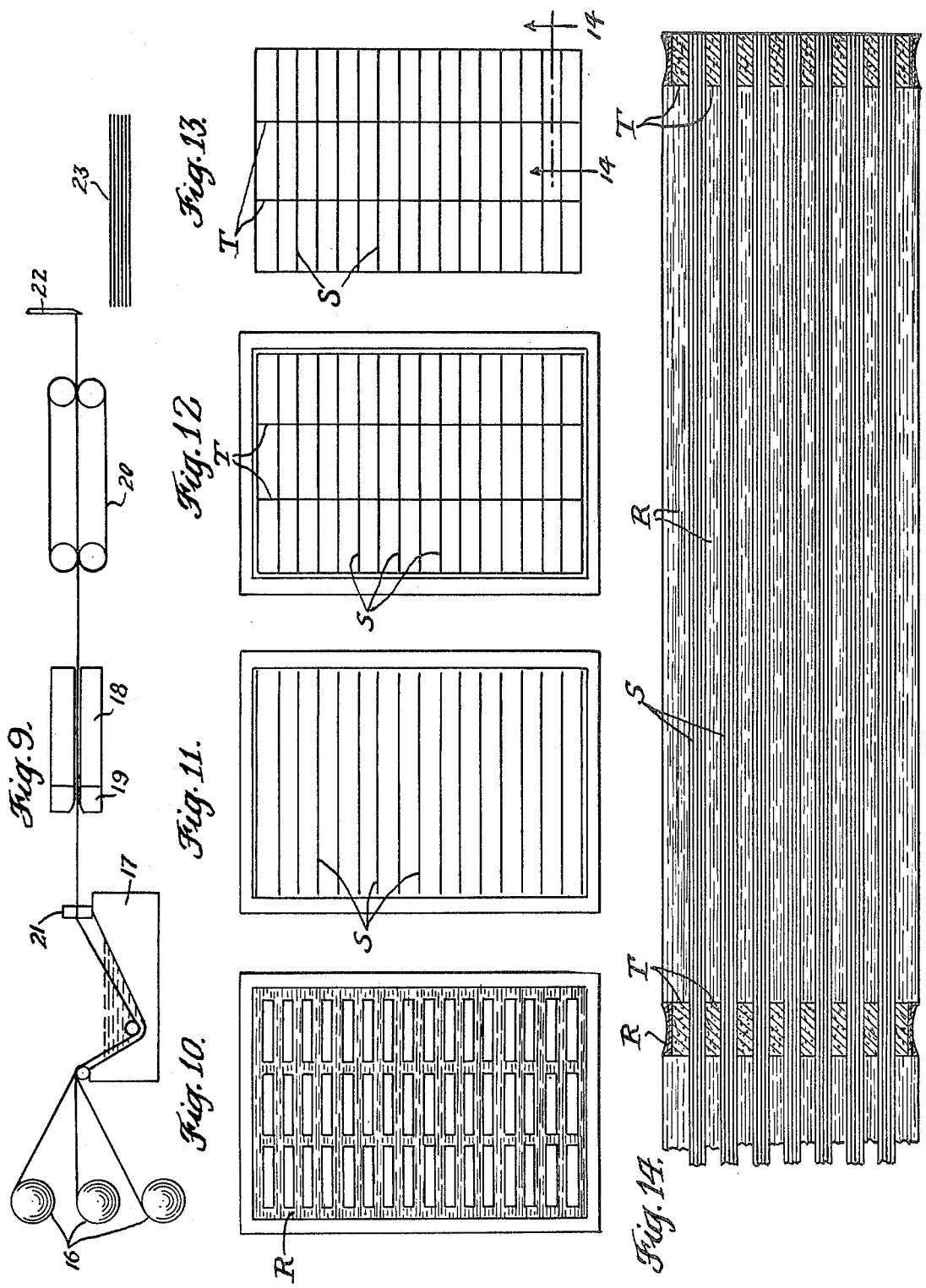

METHOD FOR MAKING FIBER REINFORCED RESIN GRATING

This is a division of application Ser. No. 110,076, filed Jan. 27, 1971, now U.S. Pat. No. 3,704,561.

This invention relates to an improved form of fiber reinforced plastic or resin grating and to a method for manufacturing the improved grating.

Several forms of gratings are known, including gratings which are made up of individual separately preformed fiber reinforced bar elements assembled and interconnected, as by providing in the bars and passing tie bolts through the apertures. In another form of known grating, the grating is made by weaving the reinforcing fibers, for instance glass fiber rovings, in a crisscross or intersecting pattern in order to distribute reinforcement fibers in both the span bars and the tie bars of the grating. In this technique, the glass fiber rovings are preimpregnated with liquid resin material, and the resin is then solidified or cured either with or without molding surfaces for defining some of the surfaces of the bars of the grating as the resin is solidified.

The present invention is concerned with an improved form of grating and an improved form of grating and an improved method for producing the grating, and the major objectives of the invention include the following:

First, it is an object of the invention to more effectively utilize the fiber reinforcement incorporated in the bars of the grating, so that a grating having bars of given dimensions will be stronger, or alternatively, so that a grating of given strength may be produced with less material. This also enables production of gratings of given strength at lower material costs.

In accordance with another aspect of the invention, provision is made for molding a complete fiber reinforced grating, without the necessity for trimming at the edges of the grating, as has been necessary with certain prior techniques. Such trimming is wasteful of material and undesirable because it involves additional manufacturing operations.

As above mentioned, the grating of the present invention is made up of reinforcing strips which are preformed by incorporation of reinforcement fibers, such as glass fiber rovings in a resin material, for instance by the so-called pultrusion technique, in which rovings impregnated with heat hardenable liquid resin are pulled through a heated forming die thereby hardening the resin in strip form while the rovings are maintained under tension. These preformed strips are then assembled in a network of cavities formed in a mold in which a liquid matrix or embedment resin has been introduced. The preformed reinforcement strips are thus submerged within the embedment resin, and the embedment resin is ultimately cured.

It will therefore be seen that the grating of the present invention incorporates two resin constituents, one which is used in the preforming of the reinforcement strips, and the other of which is used as the matrix or embedment resin. The invention thus provides for selection of specific resin materials or formulations best adapted to achieve maximum performance either as the embedment resin or as the resin incorporated in the reinforcement strips. For example in the grating of the present invention, the resin used in the reinforcement strips may be formulated to provide maximum tensile strength and to secure the best possible "wet-out" of the reinforcements incorporated therein, but such a resin formulation is not necessarily best suited to the performance of the functions of the embedment resin, such as high corrosion resistance, weathering resistance and good electrical properties. On the other hand, the embedment resin may be formulated to provide high corrosion and weathering resistance and good electrical properties, but such a formulation is not necessarily best suited to perform the functions of the resin used in the reinforcement strips.

With these factors in mind, it is an advantage of the grating of the present invention that the two resin constituents may be specially formulated for the purposes indicated. In addition, it is an objective of the present invention that the several resins be selectively formulated so that resin costs are reduced, as by using a higher cost corrosion resistant resin having good electrical properties only as the embedment resin, and using a lower cost resin in the preformation of the reinforcement strips. Other similar cost advantages can be achieved by appropriate resin formulations.

In addition to the foregoing, it is an object of the invention to provide a novel technique for making fiber reinforced resin gratings according to which much more rapid assembly or lay up is provided, it being a relatively simple operation to place flat already hardened and thus tack-free reinforcement strips into mold cavities, as compared with the prior techniques of weaving glass fiber rovings impregnated with liquid resin material. Other objects and advantages of both the product and the method of the present invention will appear more fully from the following description referring to the accompanying drawings, in which:

FIG. 1 is an isometric view of a grating constructed according to the present invention and shown with the span bars thereof bridging the space between a pair of spaced supports.

FIG. 2 is a somewhat enlarged view taken on the section line 2—2 on FIG. 1;

FIG. 3 is a further enlarged view of the corner portion of the grating of FIGS. 1 and 2 and illustrating certain details;

FIG. 5 is an enlarged fragmentary isometric view of a corner portion of the mold shown in FIG. 4.

FIG. 6 is a fragmentary vertical sectional view taken as indicated by the section line 6—6 on FIG. 5 and illustrating assembled or stacked reinforcement strips in the mold.

FIG. 7 is a fragmentary vertical sectional view taken at right angles to FIG. 6 and illustrating a mold knockout device.

FIG. 8 is an isometric view of one of the mold knockout devices;

FIG. 9 is a diagrammatic view of the pultrusion equipment adapted to produce the reinforcement strips to be used in making up the grating in accordance with the present invention.

Figure 4:
FIG. 4 is a plan view of a mold adapted for use in carrying out the method of the present invention.

FIGS. 10-13 are somewhat diagrammatic views illustrating a sequence of method steps employed in the making of a grating by the process contemplated herein; and FIG. 14 is a greatly enlarged fragmentary view of a portion of a grating made by the steps diagrammatically illustrated in FIGS. 10-13, FIG. 14 showing parts in section as indicated by the section line 14—14 on FIG. 13. In connection with FIGS. 1, 2 and 3 which illustrate various features of construction of the grating itself, it is first pointed out that in these figures the reinforcement strips and their arrangement within the span and tie bars of the grating are clearly illustrated, but it is to be understood that in the completed grating the reinforcement strips may not be as visible as is indicated in FIGS. 1, 2 and 3 and, indeed, may even be completely concealed within the embedment resin used. However, the reinforcement strips have been plainly shown in FIGS. 1, 2 and 3 to facilitate the following description.

The various specific features of construction of the grating itself will appear more fully hereinafter, especially in connection with the description of the method for making the grating, but it is here first noted that in general the grating is made up of two sets of parallel and intersecting bars. One set of bars, i.e., the "span" bars, extend between or span the space between the supports indicated at 15—15. The other set of bars extend parallel to the supports 15—15 and constitute the "tie" bars of the grating. As is customary in structural gratings, the span bars are positioned closer to each other than are the tie bars, to provide the desired span strength.

The two sets of intersecting bars of the grating are made up of two components. One of these components comprises an assembly of interleaving strips incorporating reinforcement fibers, which strips are plainly indicated in FIGS. 1, 2 and 3, and the other component consists of a matrix in which the reinforcement strips are embedded, the resin of this latter component infilling the spaces between the reinforcement strips and preferably also covering at least the side edges thereof, i.e., the side faces of the bars of the grating.

Turning now to the method of making the grating according to the invention, it is first noted that although the reinforcing strips may be prepared in a variety of ways, it is preferred that they be prepared by a technique in which the reinforcement fibers such as glass fiber rovings are maintained in tension while the resin of the strips is being solidified. A typical operation for this purpose is diagrammatically illustrated in FIG. 9, to which attention is now directed.

In FIG. 9 glass fiber rovings are supplied from the spools 16 of a creel indicated at the left of the figure. These rovings are drawn through a bath of liquid resin such as indicated at 17 and are thereby impregnated with the resin. The impregnated rovings then pass through a die structure having a heated portion 18 and a cooled entrance portion 19, the passage in this die structure conforming with the cross sectional shape desired for the reinforcement strips being made. In the die sufficient heat is applied to cure or solidify the strip, and the solidified strip delivered from the die enters the puller mechanism 20 which serves as the means for drawing the reinforcements into and through the impregnating reservoir 17 and through the die structure. the puller mechanism also serving to maintain the fibers such as the rovings referred to under tension during solidification of the resin in the die.

In a typical preferred embodiment the resin reservoir 17 is supplied with catalyzed liquid polyester resin of the desired formulation, for instance

|  | Parts by Weight |
|---|---|
| Resin - General Purpose Styrenated Polyester | 100 |
| Filler - Clay | 18 |
| Catalyst - Benzoyl Peroxide | 1.0 |
| Internal Lubricant - Mono and Di Alkyl Phosphates | 0.5 |

A resin metering device such as indicated at 21 may be associated with the rovings as they leave the body of resin in the reservoir in order to control the quantity of resin carried into the die structure. The provision of cooling means for the entrance portion 19 of the die prevents hardening of the resin outside the die.

Preferably sufficient rovings are used to provide a band of fibers of the width of a strip being made and a relatively high fiber content is preferred, for instance a content representing about 65% by weight of the strip, the balance being resin.

In the production of a typical grating having bars which are 1 inch in vertical dimension and 5/16 inch in thickness or width, the reinforcement strips are advantageously made of about ¼ inch width and 1/32 inch thick, it being contemplated that sufficient of these strips be stacked up flatwise to provide the desired overall 1 inch thickness dimension of the grating.

The strip material made in accordance with FIG. 9 may either be wound in a coil and subsequently cut to the desired lengths, or may be cut to the desired length as it is produced, for instance by a cutter diagrammatically indicated at 22 in FIG. 9, a stack of cut pieces being indicated at 23.

In order to ensure adequate bonding or adherence of the embedment resin to the surfaces of the reinforcement strips, the strips are desirably subjected to sanding or sand blasting or to chemical etching, as with methylene chloride, prior to the assembly of the strips in the mold for producing the grating.

In molding a grating with the use of the preformed strips described, an open top mold is preferably employed, for instance a mold such as illustrated in FIGS. 4–8 inclusive and as described just below. The mold comprises a base 24 with projections 25 mounted thereon in positions defining cavities 26 for molding the span bars, and cavities 27 for molding the tie bars. The mold cavities 26 and 27 intersect and thus provide for the molding of the bottom and side surfaces of all of the bars of the grating.

The base plate 24 of the mold is desirably provided with convex surfaces indicated at 28 at the base of at least some of the mold cavities, for instance at the base of the mold cavities for the span bars, in order to mold a slightly concave bottom edge surface on the bars of the grating. Knock-out bars such as indicated at 29 are desirably positioned in appropriate notches in the base plate, the bars having upper convexly curved surfaces mating with the surfaces 28 in order to form continuations of the concave edges of the bars. Pins 30 projecting downwardly from the bars 29 and extended through apertures in the base plate (see FIG. 7) provide a ready means for application of a force or blow for lifting the knock-out devices and thus releasing a molded grating from the mold.

To facilitate separation of a molded grating, it is also desirable that the projections 25 which fit into the apertures in the grating between the intersecting sets of bars are slightly relieved or tapered, i.e., of slightly smaller dimensions at the upper and free edges than at the edges adjacent to the base plate 24.

It is advantageous to construct a mold of size sufficient to provide for the molding of several different sizes of gratings. For example, with the mold shown in FIG. 4 and with span bars and tie bars of typical dimension and spacing, it would be possible to mold a grating up to a length of 4 feet and up to a width of 3 feet. For molding a grating of smaller dimension, for instance 3 feet long and 2 feet wide, blocks or plugs may be inserted into certain of the mold cavities in order to block off the portion of the mold not required. In FIG. 4 such blocks or plugs are indicated at 26a and 27a. Marginal mold strips 31 are also provided in order to mold the outer surfaces of the outermost grating bar at the sides of the grating being molded lying adjacent to the margins of the mold. Sections of cast grating is a convenient method for blocking off mold areas.

With the blocks 26a and 27a and the marginal strips 31 positioned as described just above, a grating having 37 span bars and seven tie bars, i.e., a grating as illustrated in FIG. 1 may be produced in the mold of FIG. 4.

The sequence of operations followed in molding such a grating is illustrated in the diagrammatic views of FIGS. 10-14 inclusive. In FIG. 10 it will be seen that liquid resin material R has been placed in the mold cavities, this resin material comprising the resin composition serving as the embedment resin for the reinforcement strips. FIG. 11 diagrammatically illustrates the placement of the first or lowermost strips S in the mold cavities 26 for molding the span bars of the grating. FIG. 12 diagrammatically illustrates the introduction of the first group of strips T into the mold cavities 27 for molding the tie bars of the grating. The operations of FIGS. 11 and 12 are then repeated a number of times in order to assemble and build up the desired stacks of strips, and in the preferred embodiment, the final group of strips inserted is a set of strips in the span bar cavities of the mold, so that the span bars will have reinforcement strips immediately adjacent both the top and bottom edges of the span bars of the completed grating. This is desirable in order to maximize the fiber reinforcement of the span bars.

By introducing the liquid embedment resin into the mold cavities before the assembly of the reinforcement strips, and by separately and sequentially introducing the reinforcement strips, thorough wetting of all of the surfaces of the reinforcement strips is assured, and in addition it is assured that the spaces between the superimposed strips in each set of bars will be completely infilled with resin, which would be difficult to accomplish if the strips were first stacked up and the liquid resin subsequently applied. Indeed, by virtue of the presence of the liquid resin in the mold cavities when the strips are inserted, there is even assurance that a film of resin material will lie between the adjacent surfaces of the span and tie bar strips at the points where they interleave.

The foregoing operation of inserting the reinforcement strips into the liquid embedment resin is readily performed and is capable of accomplishment with much less unintentional dripping and spillage of liquid resin material, as compared with operations in which reinforcement elements impregnated with liquid resin are required to be handled. The reinforcement strips containing the glass fiber rovings, as preferred, are readily caused to descend through the liquid embedment resin and will remain in the desired position, because the reinforcement strips are heavier than the resin. For example, in a typical case, the reinforcement strips have a specific gravity of 2.0, whereas a typical unfilled polyester embedment resin will have a specific gravity of the order of 1.2. Even a filled embedment resin (containing for example 20% clay) will have a specific gravity of only about 1.5. After complete assembly of the reinforcement strips in the manner described, the embedment resin is cured and the molded grating is removed from the mold, as by utilizing the knock-out devices 29, yielding a finished product such as fragmentarily shown on a greatly enlarged scale in FIG. 14, and shown also in FIGS. 1-4.

In a typical and preferred operation, the embedment resin may comprise a polyester resin having high corrosion and weathering resistance and also good electrical properties, for instance one made with Hexachloroendomethylene tetrahydrophthalic acid (Het acid) known commercially as Hetron and made by Hooker Chemical Co., Inc. This is desirably catalyzed for curing at room temperature, so that it is not necessary to heat the resin in the mold to effect solidification and curing thereon.

It is preferred to utilize sufficient embedment resin so that there will be a thin layer of resin above the top edges of the bars. This is desirable because the meniscus develops a slight concavity at the upper edges of the bars. This concavity at the upper edges, and the similar concavity at the lower edges produced by the convex surfaces 28 are indicated in FIGS. 3 and 14. When the grating is in use the concavity at the upper edges of the bars presents relatively sharp edges along the bars which tend to increase the traction and therefore improve the anti-slip characteristic of the grating. By providing concave edges on one or both sets of the bars at the lower side, for instance by the use of convex beads 28, the grating may be inverted in position after the top surface is worn and thereby provide for additional wear life of the grating.

It is also contemplated to apply abrasive granules to some or all of the edge surfaces of the bars, for instance to the upper edge surfaces of the span bars, as indicated at 32 in FIG. 3. These granules are desirably distributed over the film of resin overlying the uppermost reinforcement strips, prior to solidification of the resin. The fact that the grating is built up by means of preformed, i.e., presolidified, reinforcement strips, prevents the applied granules from becoming completely submerged in the embedment resin. By limiting the quantity of resin used only a thin film will overly the uppermost reinforcement strips, and since the strips are solid they will prevent the abrasive granules from sinking below the surface of the resin.

Although all of the strips S and T may be of the same width and thickness, in some cases it may be desirable and/or economically advantageous, to employ top and bottom reinforcement strips for the span bars of greater thickness than the strips used either in the intermediate region of the span bars or in the tie bars. This will further aid in concentrating the glass fiber reinforcement near the planes of the top and bottom of the grating, and thereby enhance the strength characteristics for a given content of glass fibers.

The grating and method of manufacture as above described provides for uniformity of production without waste of material, no trimming operations being required. It is also of special advantage that the reinforcement srrips are formed by a technique according to which the glass fiber rovings preferably used are maintained under tension during the formation of the strips and the solidification of the strip resin. The tensioned condition of the reinforcements is thus "captured" so to speak and this results in much more efficient reinforcement action by the individual strands or rovings, than is possible where the rovings are woven into the pattern of the grating bars.

It is to be understood that other techniques may be used for producing the reinforcement strips, but preferably the strips are formed by solidifying the reinforcement impregnating resin while the reinforcement fibers are maintained under tension. Such an alternative system involves the use of an uncured B staged solid polyester resin. In this alternative, the rovings or other fiber reinforcement are fed along with the resin into a die structure in which the entrance end portion is heated to soften and fuse the B stage resin, but not sufficiently to cure the resin. In a subsequent portion of the die the resin is cooled in order to "freeze" the strip to the desired shape. As in FIG. 9 the resin and reinforcements are drawn through the die structure by means of a puller mechanism which therefore establishes tension in the strip while it is being cooled and solidified in the desired shape. Strips made in this way may subsequently be inserted into the mold and built up in the desired pattern in the positions of the span and tie bars of the grating. With an embedment resin appropriately formulated to cure by application of heat, the resin of the reinforcement strips and the embedment resin may both be cured concurrently. This alternative technique which is usable according to the invention has the advantage that the common curing of both resin components at the same time will result in bonding of the resin components to each other and thus eliminate the necessity for sanding or etching the surfaces of the reinforcement strips prior to insertion thereof into the mold.

In still another alternative technique, instead of formulating the resin used as the embedment resin from a polyester type of resin, the embedment resin may comprise an epoxy resin. In this case also the sand blasting or chemical etching of the reinforcement strips may be eliminated, because of the high adhesion of the epoxy resin to surfaces of the strips, regardless of the roughness or smoothness thereof.

From the foregoing it will be seen that there are several different resin systems which may be utilized in making up gratings in accordance with the invention. It is particularly to be noted that the solidification of the embedment or matrix resin need not necessarily require application of heat, since even with polyester resin contemplated for use, the resin may be formulated or catalyzed to cure at room temperature and may thus solidify merely by permitting the resin to stand in the mold. Moreover while various different techniques may be utilized in producing the reinforcement strips used in accordance with the present invention, it is of importance that the reinforcement fibers, preferably glass fibers, be embedded in the strips under tension, thereby markedly increasing the effectiveness of a given weight of reinforcement utilized.

I claim:

1. A method for making a grating having two sets of bars with the bars of one set parallel to each other and intersecting the bars of the other set, comprising introducing hardenable liquid resin in a mold having two sets of parallel intersecting cavities for molding the two sets of bars of the grating, placing a set of preformed fiber reinforced solidified resin strips in the parallel cavities of one of said sets of cavities in the mold, placing another set of preformed fiber reinforced solidified resin strips in the set of cavities of the other parallel set of cavities in the mold in positions overlying the strips of the first set, alternately placing additional sets of similar strips in each of the sets of cavities to provide interleaving strips in the positions of each of the sets of bars of the grating being formed, each set of said strips being submerged in liquid resin previously introduced into the mold cavities, and hardening said liquid resin with the strips embedded therein.

2. A method for making a grating having intersecting span bars and tie bars, comprising assembling preformed fiber reinforced solidified resin strips in the positions of said bars with the strips in the position of each of the span bars spaced from each other and interleaving with the strips in the positions of the tie bars, the strips being assembled in the presence of hardenable liquid resin in the inter-strip spaces, and hardening the resin in situ in said spaces.

* * * * *

UNITED STATES PATENT AND TRADEMARK OFFICE
CERTIFICATE OF CORRECTION

PATENT NO. : 4,028,460
DATED : June 7, 1977
INVENTOR(S) : Leonard S. Meyer

It is certified that error appears in the above-identified patent and that said Letters Patent are hereby corrected as shown below:

Abstract -- Line 6 -- change "forcing" to read --forming--.

Column 1 -- Line 9 -- before "gratings" insert --resin--.

Column 1 -- Line 12 -- after "providing" insert --apertures--.

Signed and Sealed this

Twentieth Day of September 1977

[SEAL]

Attest:

RUTH C. MASON
Attesting Officer

LUTRELLE F. PARKER
Acting Commissioner of Patents and Trademarks